United States Patent
Nomura

(10) Patent No.: US 10,921,146 B2
(45) Date of Patent: Feb. 16, 2021

(54) USER GUIDANCE SYSTEM

(71) Applicant: TOYOTA JIDOSHA KABUSHIKI KAISHA, Toyota (JP)

(72) Inventor: Masakazu Nomura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 170 days.

(21) Appl. No.: 15/840,767

(22) Filed: Dec. 13, 2017

(65) Prior Publication Data
US 2018/0172465 A1    Jun. 21, 2018

(30) Foreign Application Priority Data
Dec. 15, 2016  (JP) .............................. JP2016-243435

(51) Int. Cl.
G01C 21/34  (2006.01)
G01C 21/36  (2006.01)

(52) U.S. Cl.
CPC ..... *G01C 21/3484* (2013.01); *G01C 21/3461* (2013.01); *G01C 21/3476* (2013.01); *G01C 21/3694* (2013.01)

(58) Field of Classification Search
CPC ..................................... G01C 21/34
See application file for complete search history.

(56) References Cited

U.S. PATENT DOCUMENTS

| 4,086,632 A | * | 4/1978 | Lions | G01C 21/00 340/286.14 |
| 4,301,506 A | * | 11/1981 | Turco | G01C 21/3415 340/988 |
| 4,570,227 A | * | 2/1986 | Tachi | G01C 21/20 340/990 |
| 4,674,051 A | * | 6/1987 | Fischer | G01S 5/02 342/401 |
| 5,931,888 A | * | 8/1999 | Hiyokawa | G01C 21/34 701/411 |

(Continued)

FOREIGN PATENT DOCUMENTS

| JP | H05196473 A | 8/1993 |
| JP | 2011085980 A | 4/2011 |

(Continued)

*Primary Examiner* — Alex C Dunn
(74) *Attorney, Agent, or Firm* — Hunton Andrews Kurth LLP

(57) ABSTRACT

A user guidance system includes a departure point acquisition unit that acquires departure point information, a destination acquisition unit that acquires destination information, a candidate route generation unit that generates a plurality of candidate routes, a point resource acquisition unit that acquires point resource information, a desire information acquisition unit that acquires desire information indicating a via point desired by the attraction desirer, a non-desire information acquisition unit that acquires non-desire information indicating a via point not desired by the attraction desirer, a point calculation unit that calculates a point that is imparted to the candidate route, or a via route or the via point included in the candidate route, and a point providing unit that provides point information indicating the point that is imparted to the candidate route or the via point included in the candidate route to a user.

10 Claims, 7 Drawing Sheets

(56) References Cited

U.S. PATENT DOCUMENTS

| | | | |
|---|---|---|---|
| 6,061,629 A | 5/2000 | Yano et al. | |
| 9,354,065 B2* | 5/2016 | Ikavalko | G01C 21/00 |
| 2012/0158285 A1 | 6/2012 | Yamazaki et al. | |
| 2013/0226457 A1* | 8/2013 | Goel | G01C 21/3476 |
| | | | 701/540 |
| 2015/0112860 A1* | 4/2015 | Wang | G06Q 20/322 |
| | | | 705/39 |
| 2015/0285652 A1* | 10/2015 | Peri | G01C 21/3476 |
| | | | 701/438 |
| 2016/0195403 A1* | 7/2016 | Tuukkanen | G01C 21/3423 |
| | | | 701/533 |
| 2016/0258767 A1* | 9/2016 | Nevrekar | G06F 16/9537 |
| 2016/0260077 A1* | 9/2016 | Hwang | G06Q 20/3563 |
| 2017/0109727 A1* | 4/2017 | Han | G06Q 20/3674 |
| 2017/0336221 A1* | 11/2017 | Salowitz | G01C 21/3605 |
| 2017/0343365 A1* | 11/2017 | Mokhnatkina | G01C 21/343 |
| 2018/0017400 A1* | 1/2018 | Andrew | G01C 21/3476 |
| 2018/0038704 A1* | 2/2018 | Nilsson | G01C 21/343 |

FOREIGN PATENT DOCUMENTS

| | | |
|---|---|---|
| JP | 2011-198277 A | 10/2011 |
| JP | 2011-203784 A | 10/2011 |
| JP | 2012-107923 A | 6/2012 |
| JP | 2012127770 A | 7/2012 |

* cited by examiner

FIG. 4A

| ID OF ATTRACTION DESIRER | POINT RESORCE |
|---|---|
| ID001 | 100,000 |
| . . . | . . . |
| . . . | . . . |

FIG. 4B

| ID OF ATTRACTION DESIRER | DESIRE INFORMATION |
|---|---|
| ID001 | XXX001 |
|  |  |
| . . . | . . . |

FIG. 4C

| ID OF ATTRACTION DESIRER | NON-DESIRE INFORMATION |
|---|---|
| ID001 | YYY001 |
|  |  |
| . . . |  |

FIG. 6A

| CANDIDATE ROUTE | DESIRE INFORMATION (VIA ROUTE OR VIA POINT) |
|---|---|
| Route001 | XXX001 |
| ... | ... |
| ... | ... |

FIG. 6B

| CANDIDATE ROUTE | NON-DESIRE INFORMATION (VIA ROUTE OR VIA POINT) |
|---|---|
| Route003 | YYY001 |
| ... | ... |
| ... | ... |

FIG. 6C

| ID OF USER | POINT |
|---|---|
| User_ID001 | 500 |
| ... | ... |
| ... | ... |

USER GUIDANCE SYSTEM

INCORPORATION BY REFERENCE

The disclosure of Japanese Patent Application No. 2016-243435 filed on Dec. 15, 2016 including the specification, drawings and abstract is incorporated herein by reference in its entirety.

BACKGROUND

1. Technical Field

The present disclosure relates to a user guidance system.

2. Description of Related Art

In the related art, there is a bypass route guidance system that includes a navigation server, and a corporate point management server that manages a corporate point of a consumer, in which an extra point is imparted in a store on a bypass route when traffic jam occurs (for example, Japanese Unexamined Patent Application Publication No. 2011-203784 (JP 2011-203784A)).

SUMMARY

By the way, the bypass route guidance system of the related art can guide users to a store that is on a bypass route, but cannot guide the users for the purpose other than a stopover in the store.

Accordingly, the present disclosure provides a user guidance system capable of guiding users according to various purposes.

A first aspect of the present disclosure relates to a user guidance system including a departure point acquisition unit that acquires departure point information indicating a departure point of a user, a destination acquisition unit that acquires destination information indicating a destination of the user, a candidate route generation unit that generates a plurality of candidate routes from the departure point information and the destination information, a point resource acquisition unit that acquires point resource information indicating point resources from an attraction desirer, a desire information acquisition unit that acquires desire information indicating a via route through which the attraction desirer desires for a user to pass or a via point that the attraction desirer desires for the user to visit, a non-desire information acquisition unit that acquires non-desire information indicating a via route via which the attraction desirer does not desire for the user to pass or a via point that the attraction desirer does not desire for the user to visit, a point calculation unit that calculates a point that is imparted to the candidate route, or the via route or the via point included in the candidate route based on the point resource information, the desire information, or the non-desire information, and a point providing unit that provides point information indicating the point that is imparted to the candidate route, or the via route or the via point included in the candidate route to the user.

According to the first aspect of the present disclosure, by the attraction desirer setting the desire information or the non-desire information, it is possible to guide the user to the via route or the via point indicated by the non-desire information, or the candidate route including the via route or the via point indicated by the non-desire information. Further, it is possible to guide the user to the via route or the via point other than the via route or the via point indicated by the non-desire information or the candidate route including the via route or the via point other than the via route or the via point indicated by the non-desire information.

Accordingly, it is possible to provide the user guidance system that can guide a user according to various purposes.

In the user guidance system according to the first aspect of the present disclosure, the point calculation unit may calculate a point to be imparted to each of candidate routes so that the user is guided to the via route or the via point indicated by the desire information, or the candidate route including the via route or the via point.

According to the first aspect of the present disclosure, a relatively high point is imparted to the via route indicated by the desire information in order to collect (attract) more users.

Accordingly, it is possible to provide the user guidance system that can more effectively guide users according to various purposes.

In the user guidance system according to the first aspect of the present disclosure, the point calculation unit may calculate a point to be imparted to each of candidate routes so that the user is not guided to the via route or the via point indicated by the non-desire information, or the candidate route including the via route or the via point.

According to the first aspect of the present disclosure, a relatively high point is imparted to the candidate route other than the via route indicated by the non-desire information in order to collect (attract) more users without guiding users to the via route indicated by the non-desire information.

Accordingly, it is possible to provide the user guidance system that can more effectively guide users according to various purposes.

The user guidance system according to the first aspect of the present disclosure may further include a current point acquisition unit that acquires current point information indicating a current point of the user. The point providing unit may provide point information indicating a point to be imparted to the candidate route, or the via route or the via point included in the candidate route to the user when the current point indicated by the current point information is included in the candidate route, or the via route or the via point included in the candidate route.

According to the first aspect of the present disclosure, when the user actually goes to the candidate route, or the via route or the via point included in the candidate route, the point is imparted.

Accordingly, it is possible to provide the user guidance system that can more reliably guide users according to various purposes.

A second aspect of the present disclosure relates to a user guidance system including a departure point acquisition unit that acquires departure point information indicating a departure point of a user, a destination acquisition unit that acquires destination information indicating a destination of the user, a candidate route generation unit that generates a plurality of candidate routes from the departure point information and the destination information, a point resource acquisition unit that acquires point resource information indicating point resources from an attraction desirer, a desire information acquisition unit that acquires desire information indicating a via route through which the attraction desirer desires for a user to pass or a via point that the attraction desirer desires for the user to visit, a point calculation unit that calculates a point that is imparted to the candidate route, or the via route or the via point included in the candidate route based on the point resource information and the desire information, and a point providing unit that provides point information indicating the point that is imparted to the candidate route, or the via route or the via point included in the candidate route to the user.

In the user guidance system according to the second aspect of the present disclosure, the point calculation unit may calculate a point to be imparted to each of candidate routes so that the user is guided to the via route or the via point indicated by the desire information, or the candidate route including the via route or the via point.

The user guidance system according to the second aspect of the present disclosure may further include a current point acquisition unit that acquires current point information indicating a current point of the user. The point providing unit may provide point information indicating a point to be imparted to the candidate route, or the via route or the via point included in the candidate route to the user when the current point indicated by the current point information is included in the candidate route, or the via route or the via point included in the candidate route.

A third aspect of the present disclosure relates to a user guidance system including a departure point acquisition unit that acquires departure point information indicating a departure point of a user, a destination acquisition unit that acquires destination information indicating a destination of the user, a candidate route generation unit that generates a plurality of candidate routes from the departure point information and the destination information, a point resource acquisition unit that acquires point resource information indicating point resources from an attraction desirer, a non-desire information acquisition unit that acquires non-desire information indicating a via route via which the attraction desirer does not desire for the user to pass or a via point that the attraction desirer does not desire for the user to visit, a point calculation unit that calculates a point that is imparted to the candidate route, or the via route or the via point included in the candidate route based on the point resource information and the non-desire information, and a point providing unit that provides point information indicating the point that is imparted to the candidate route, or the via route or the via point included in the candidate route to the user.

In the user guidance system according to the third aspect of the present disclosure, the point calculation unit may calculate a point to be imparted to each of candidate routes so that the user is not guided to the via route or the via point indicated by the non-desire information, or a candidate route including the via route or the via point.

The user guidance system according to the third aspect of the present disclosure may further include a current point acquisition unit that acquires current point information indicating a current point of the user. The point providing unit may provide point information indicating a point to be imparted to the candidate route, or the via route or the via point included in the candidate route to the user when the current point indicated by the current point information is included in the candidate route, or the via route or the via point included in the candidate route.

Accordingly, it is possible to provide the user guidance system that can guide a user according to various purposes.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4A is a diagram illustrating an example of data that is used in a flow illustrated in FIG. 3;

FIG. 4B is a diagram illustrating an example of data that is used in a flow illustrated in FIG. 3;

FIG. 4C is a diagram illustrating an example of data that is used in a flow illustrated in FIG. 3;

FIG. 6A is a diagram illustrating an example of data that is created in the process in which the user guidance system imparts the point according to the behavior of the user;

FIG. 6B is a diagram illustrating an example of data that is created in the process in which the user guidance system imparts the point according to the behavior of the user;

FIG. 6C is a diagram illustrating an example of data that is created in the process in which the user guidance system imparts the point according to the behavior of the user.

DETAILED DESCRIPTION OF EMBODIMENTS

Hereinafter, an embodiment to which a user guidance system of the present disclosure has been applied will be described.

Embodiments

Figure 1:
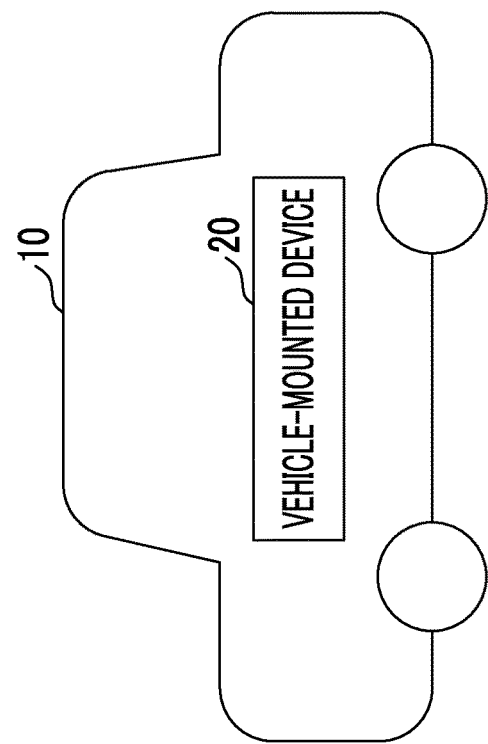
FIG. 1 is a diagram illustrating a vehicle and a user guidance system.
Figure 1:
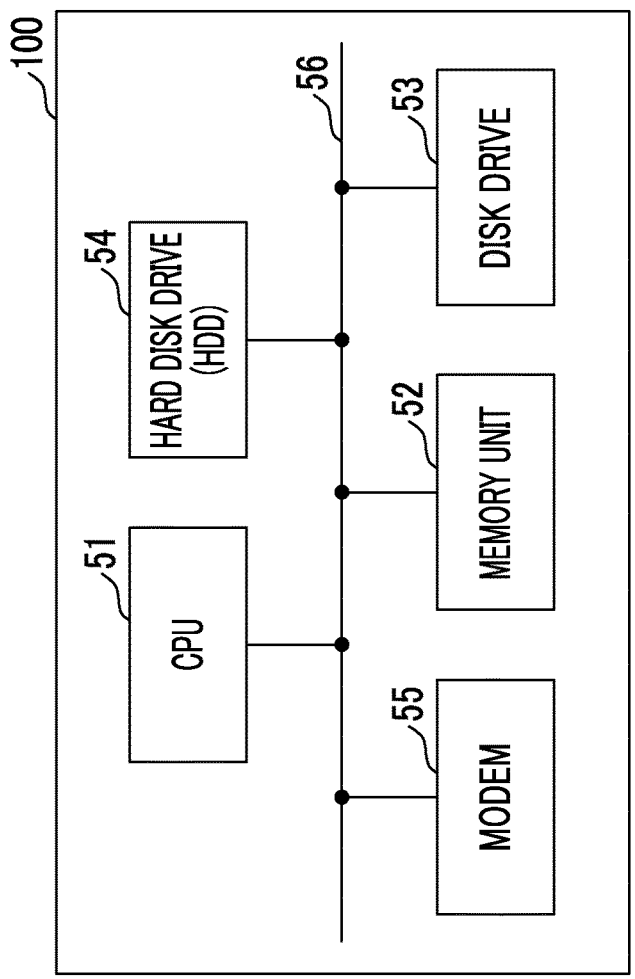

FIG. 1 is a diagram illustrating a vehicle 10 and a user guidance system 100.

The vehicle 10 is, for example, a hybrid vehicle (HV), a plug-in hybrid vehicle (PHV), an electric vehicle (EV), a gasoline engine vehicle, or a diesel engine vehicle. A vehicle-mounted device 20 capable of communicating with the user guidance system 100 is mounted on the vehicle 10.

Here, a hardware configuration of the user guidance system 100 realized by a computer system such as a server will be described.

The user guidance system 100 includes a CPU 51, a memory unit 52 including a RAM or a ROM, a disk drive 53 such as a Compact Disc Read Only Memory (CD-ROM) or a Digital Video Disc Read Only Memory (DVD-ROM), a hard disk drive (HDD) 54, and a modem 55. These are connected by a bus 56. Further, the user guidance system 100 may further include a display such as a liquid crystal monitor, a keyboard, a mouse, and the like.

A program that causes the server (computer system) to function as the user guidance system 100 is downloaded from another computer system via the disk drive 53 or the modem 55, input to the server (computer system), and compiled. The user guidance system 100 performs wireless communication with the vehicle-mounted device 20 via the modem 55.

Figure 2:
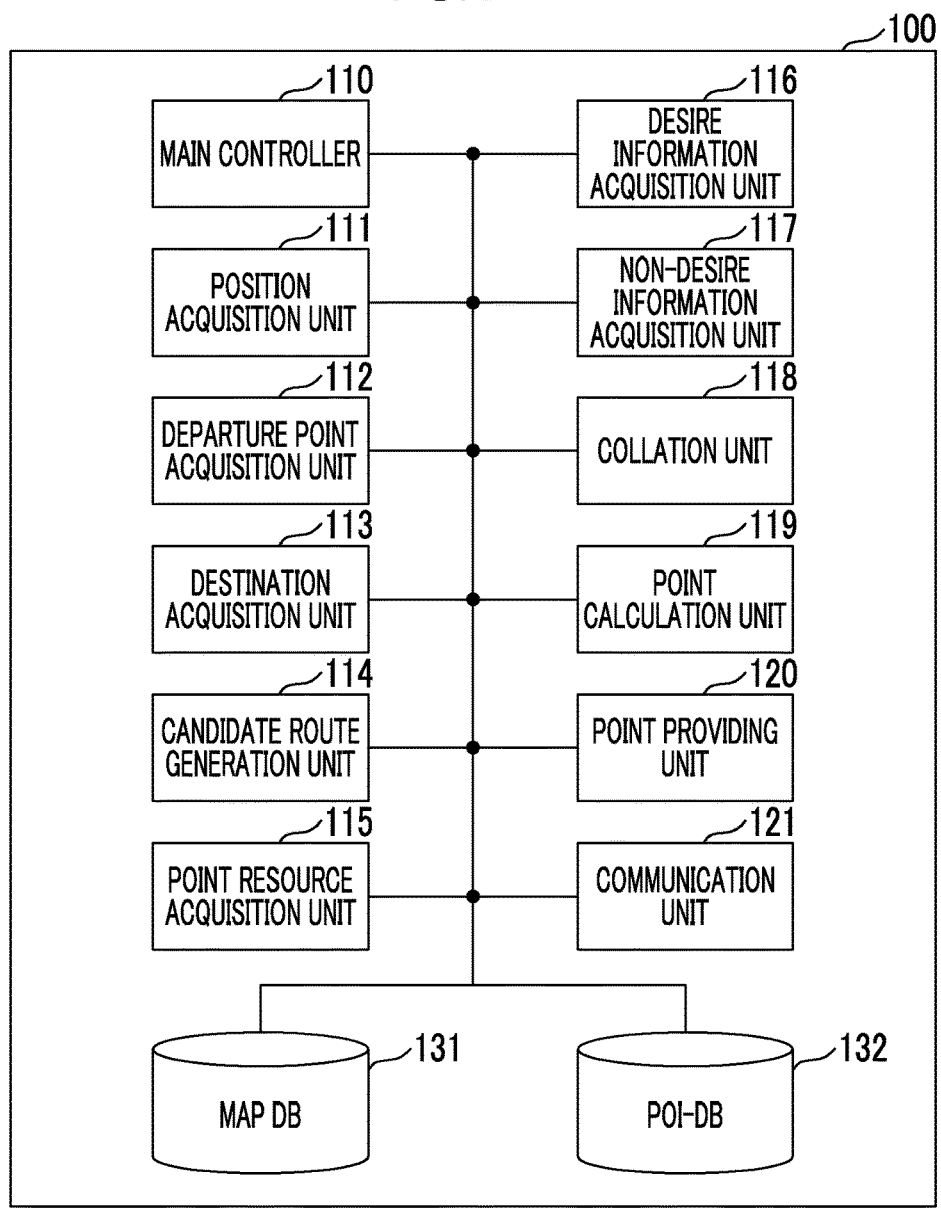
FIG. 2 is a diagram illustrating a functional configuration of a vehicle-mounted device and a user guidance system.

FIG. 2 is a diagram illustrating a functional configuration of the vehicle-mounted device 20 and the user guidance system 100. Here, the vehicle-mounted device 20 is an example of a terminal of the user.

Here, a user refers to a person who performs data communication with the user guidance system 100 using the vehicle-mounted device 20 and receives information such as a candidate route or a point from the user guidance system 100 to the vehicle-mounted device 20.

Further, the attraction desirer is a person who desires to attract the user using the user guidance system 100 so that a user of the user guidance system 100 passes through a predetermined route or a predetermined point or so that the user of the user guidance system 100 does not pass through the predetermined route or the predetermined point.

Hereinafter, a route via (through) which the attraction desirer desires or does not desire for a user to go (pass) is referred to as a via route, and a point via (through) which the attraction desirer desires or does not desire for a user to go (pass) is referred to as a via point. The attraction desirer can register, in the user guidance system 100, desire information indicating the via route or the via point via which the attraction desirer desires for the user to go. Further, the attraction desirer can register, in the user guidance system 100, non-desire information indicating a via route or a via point via which the attraction desirer does not desire for the user to go.

The vehicle-mounted device 20 includes a controller 21, a position detection unit 22, a communication unit 23, and a display unit 24. The vehicle-mounted device 20 is, for example, a navigation device. An application for performing data communication with the user guidance system 100 is installed in the vehicle-mounted device 20.

The controller 21 performs various control processes for realizing a function or an operation of the vehicle-mounted device 20. The controller 21 causes, for example, the display unit 24 to display an image of a map or a current point of the vehicle 10 that is detected by the position detection unit 22, and performs route search or route guidance to a destination. Further, the controller 21 executes the application of the user guidance system 100, and performs a required process according to the position data detected by the position detection unit 22.

The position detection unit 22 may be a device that can detect a position of the vehicle 10. The position detection unit 22 is, for example, a navigation device, and detects a latitude and a longitude of a current point of the vehicle 10 based on a signal acquired from a Global Positioning System (GPS) satellite, and outputs position data indicating the latitude and the longitude of the current point. Further, the position detection unit 22 may further include a device that can acquire an altitude, such as an atmospheric pressure sensor.

The communication unit 23 is a device that performs bidirectional wireless communication with the user guidance system 100 and can be recognized as a data communication module (DCM). The wireless communication is communication that is performed via a communication line such as Third Generation (3G), Fourth Generation (4G), Long Term Evolution (LTE), or Fifth Generation (5G). The communication unit 23 may be provided outside a casing of the vehicle-mounted device 20. Further, although an aspect in which the communication unit 23 is included in the vehicle-mounted device 20 will be described herein, a smartphone terminal of a user may be used as the communication unit 23.

The display unit 24 is a display and is, for example, a liquid crystal panel or an organic Electroluminescence (EL) panel. The display unit 24 is arranged, for example, inside a dashboard, a center console, or a meter panel. Further, the display unit 24 may be a head-up display.

An image or information displayed by the display unit 24 is controlled by the controller 21. The display unit 24 displays an image of a map that is output by the navigation device, a current point of the vehicle 10 that is detected by the position detection unit 22, information that is provided by the user guidance system 100, and the like.

The user guidance system 100 includes a main controller 110, a position acquisition unit 111, a departure point acquisition unit 112, a destination acquisition unit 113, a candidate route generation unit 114, a point resource acquisition unit 115, a desire information acquisition unit 116, a non-desire information acquisition unit 117, a collation unit 118, a point calculation unit 119, a point providing unit 120, a communication unit 121, a map database (DB) 131, and a POI-DB 132.

The user guidance system 100 performs the same process in parallel for a plurality of users. Therefore, here, a scene in which the user guidance system 100 performs communication with the vehicle-mounted device 20 mounted on the vehicle 10 and performs a predetermined process when a specific user uses the specific vehicle 10 will be described. The user guidance system 100 associates an ID of the user with the ID of the vehicle-mounted device 20 and stores the IDs in the disk drive 53.

The main controller 110 is a controller that generally controls a control process of the user guidance system 100. Further, the main controller 110 includes several processes different from processes that are performed by the position acquisition unit 111, the departure point acquisition unit 112, the destination acquisition unit 113, the candidate route generation unit 114, the point resource acquisition unit 115, the desire information acquisition unit 116, the non-desire information acquisition unit 117, the collation unit 118, the point calculation unit 119, the point providing unit 120, and the communication unit 121.

The position acquisition unit 111 periodically (for example, at every one minute or every five minutes) acquires the position data and the ID of the vehicle-mounted device 20 from the vehicle 10 via the communication unit 121.

The departure point acquisition unit 112 acquires departure point information indicating a departure point of the user via the communication unit 121. The departure point information is data indicating the departure point of the user. The departure point may be a current point that is acquired by the vehicle-mounted device 20 or may be a point that the user inputs to the vehicle-mounted device 20. The departure point is represented by, for example, a latitude and a longitude.

The destination acquisition unit 113 acquires the destination information indicating a destination of the user via the communication unit 121. The destination information is data indicating the destination of the user. The destination is input to the vehicle-mounted device 20 by the user. The destination is represented by, for example, a latitude and a longitude.

The candidate route generation unit 114 generates a plurality of candidate routes connecting the departure point to the destination. The candidate route is a candidate of a route connecting the departure point to the destination, and the candidate route generation unit 114 generates a plurality of candidate routes.

The point resource acquisition unit 115 acquires point resource information indicating point resources that are input by the attraction desirer. The point resources are resources of a point that is provided to the user. The point can be used, for example, as a toll fee or a discount coupon for a toll road, or as a usage fee or a discount coupon for a predetermined store or commercial facility. The attraction desirer accesses the user guidance system 100 with his or her PC or the like and purchases the point resources.

The desire information acquisition unit 116 acquires the desire information that is input by the attraction desirer. The attraction desirer can access the user guidance system 100 with his or her PC or the like and input the desire information indicating a via route or a via point via which the user desires to go, to the user guidance system 100. The desire information acquisition unit 116 acquires the desire information that is input by the attraction desirer and stores the desire information in the disk drive 53.

The non-desire information acquisition unit 117 acquires non-desire information that is input by the attraction desirer. The attraction desirer can access the user guidance system 100 with his or her PC or the like and input the non-desire information indicating a via route or a via point via which the user does not desire to go, to the user guidance system 100. The non-desire information acquisition unit 117 acquires the non-desire information that is input by the attraction desirer and stores the desire information in the disk drive 53.

The collation unit 118 reads the desire information and/or the non-desire information stored in the disk drive 53, collates a plurality of candidate routes generated by the candidate route generation unit 114 with the read desire information and/or non-desire information. Here, the reason for writing the desire information and/or the non-desire information is because there may be a case where both the desire information and the non-desire information are stored in the disk drive 53, and a case where one of the desire information and the non-desire information is stored in the disk drive 53.

Based on the point resource information and the desire information and/or non-desire information, the point calculation unit 119 calculates a point that is imparted to each of the candidate routes, or a via route or a via point included in the candidate routes. A method of calculating the points will be described below.

When the current point of the user indicated by the positional information that is acquired by the position acquisition unit 111 is included in any one of the via route or is at the via point, the point providing unit 120 provides a point assigned to the via route or the via point to the user. The provided point is transferred to a point account of the user.

The communication unit 121 performs wireless communication with the vehicle-mounted device 20, and transmits and receives data (information) or the like required for the user guidance system 100 and the vehicle-mounted device 20 to perform a process.

The map DB 131 registers map data. The map data is data for drawing a map such as a route map for representing a traffic network, and includes road map data and route map data. The road map data is, for example, map data meshed according to a scale (for example, first to third region partition mesh data of JIS standard, and 100 m mesh data). More specifically, the road map data is, for example, image data for map drawing in a raster format, or a vector format. The route map data is drawing data indicating a route map obtained by diagramming a route.

The POI-DB 132 is a database that stores a Point Of Interest (POI) information related to the map data. The POI information indicates an ID, name, a category (genre), and a position (a latitude and a longitude) of a store or a facility that is present along a road included in the map data.

The category (genre) includes categories such as car (general), motorsports, a dealer, a car shop, a car museum, a motor show, a circuit, a racing school, a drive course, a car wash place, and an auto campground with respect to a car. The category may have a hierarchical structure in which a category such as motorsports, . . . , an auto campground is arranged on a layer under the category of car (general). The hierarchy may include three or more layers.

Further, the category includes, for example, shrines and temples, a beach, a hiking course, a golf course, a tennis court, a swimming pool, a fitness club, a meal (general), a hot spring, and an accommodation facility (general) with respect to an item other than the car. A hierarchical structure may be formed such that a category such as Japanese food (general), fast food, cafe, ramen, Italian, and French is arranged on a layer under the category of meal (general). Further, a hierarchical structure may be formed such that a category such as fish dishes, teppanyaki, and tempura is arranged on a layer under the category of Japanese food (general). Further, a hierarchical structure may be formed such that a category such as an inn, a guest house, a hotel, and an auberge is arranged on a layer under the category of the accommodation facility (general).

Further, the POI information may include data such as data regarding a shape of a feature (for example, a structure such as a building, a house or a station, a road, a railroad, a bridge, a tunnel, a contour, a water line such as a coastline or a shore line, sea, river, lake, pond, swamp, land such as a park or an outdoor facility, an administrative circle, an administrative district, or block area) shown on the map, data regarding notes (for example, a place name, an address, a telephone number, a facility name such as a store, a park, and a station, a name including a common name of sights, a historic site, river, lake, a bay, a mountain, or a forest, a name of a road, a bridge, and a tunnel, a route name, point information, and review information) shown on the map, and symbol data of a symbol (for example, a map symbol of a mountain, a historical site, a shrine, a school, a hospital, a factory, a cemetery, and the like, a store symbol of a gas station, a convenience store, a supermarket, a restaurant, a bank, a post office, and the like, a symbol of a facility such as a sign on a road, an entrance and exit of a toll road, a toll booth, a service area (SA), and a parking area (PA), or an interchange (IC), and a facility symbol of a parking lot, a station, a hotel, an art museum, a museum, or the like) or the like shown on the map.

The user guidance system 100 may include a surrounding information DB in which information on surroundings has been registered, in addition to the map DB 131 and the POI-DB 132. The surrounding information DB is a database in which information (information on surroundings) including at least types or names of a gas station, a convenience store, a supermarket, a department store, a restaurant, a bank, a post office, a parking lot, a park, a toilet, a station, a hotel, an art museum, a museum, and the like, which are displayed as symbols on the map, is registered. The information on surroundings is used when information on a store, a facility, or the like around the current position of the vehicle 10 is extracted in the navigation device.

The via route is represented using the POI or the information on surroundings. For example, a start point and an end point of the via route can be represented by the POI or the information on surroundings. The start point and the end point of the via route may be represented by a latitude and a longitude. Further, the via point can be represented by the POI or the information on surroundings or may be represented by a latitude and a longitude.

Figure 3:
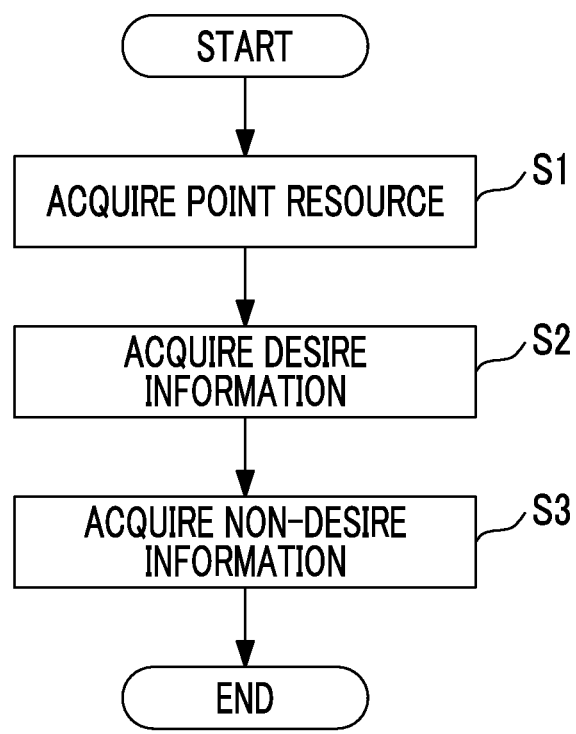
FIG. 3 is a flowchart illustrating a process that is executed by a user guidance system when an attraction desirer registers point resource information, desire information, and non-desire information.

FIG. 3 is a diagram illustrating a flowchart indicating a process that is executed by the user guidance system 100 when the attraction desirer registers the point resource information, the desire information, and the non-desire information. FIGS. 4A to 4C are diagrams illustrating an example of data that is used in a flow illustrated in FIG. 3.

The main controller 110 starts a process when the start of the process is required by the attraction desirer. The attraction desirer can access the user guidance system 100 via the Internet in its own personal computer (PC) or the like and request start of the process.

The point resource acquisition unit 115 acquires the point resource information indicating point resources that are input by the attraction desirer (step S1). The point resource acquisition unit 115 stores an ID (Identifier) of the attraction desirer and the point resource information indicating the point resources in the disk drive 53 in association with each other, as illustrated in FIG. 4A.

In the example illustrated in FIG. 4A, the attraction desirer having an ID of ID001 purchases point resources of 100,000 points, and ID (ID001) of the attraction desirer and the point resource information (100,000 points) are stored as data in a table format in the disk drive 53 in association with each other.

FIG. 4A illustrates one piece of point resource information of one attraction desirer, but a plurality of pieces of point resource information purchased by a plurality of attraction desirers is stored in the data in a table format. Price of point resources (sales amount per point) may be determined by an operator of the user guidance system 100 in advance. The operator is a person who performs operation and management of the user guidance system 100.

Next, the desire information acquisition unit 116 acquires the desire information that is input by the attraction desirer (step S2). The desire information acquisition unit 116 stores the desire information and the ID of the attraction desirer in the disk drive 53 in association with each other, as illustrated in FIG. 4B.

In FIG. 4B, for example, the attraction desirer with an ID of ID001 inputs desire information indicating the via route or the via point indicated by a code XXX001, and ID (ID001) of the attraction desirer and code (XXX001) of the desire information are stored as data in a table format in the disk drive 53 in association with each other. FIG. 4B illustrates one piece of desire information of one attraction desirer. However, in the data in a table format, a plurality of pieces of desire information of one attraction desirer is stored and desire information of a plurality of attraction desirers is stored.

Next, the non-desire information acquisition unit 117 acquires non-desire information that is input by the attraction desirer (step S3). The non-desire information acquisition unit 117 stores the non-desire information and the ID of the attraction desirer in the disk drive 53 in association with each other, as illustrated in FIG. 4C.

In FIG. 4C, for example, an attraction desirer having an ID of ID001 inputs non-desire information indicating the via route or the via point represented by code YYY001, and ID (ID001) of the attraction desirer and code (YYY001) of the non-desire information are stored as data in a table format in the disk drive 53 in association with each other. FIG. 4C illustrates one piece of non-desire information of one attraction desirer. However, in the data in a table format, a plurality of pieces of non-desire information of one attraction desirer is stored and non-desire information of a plurality of attraction desirers is stored.

Figure 5:
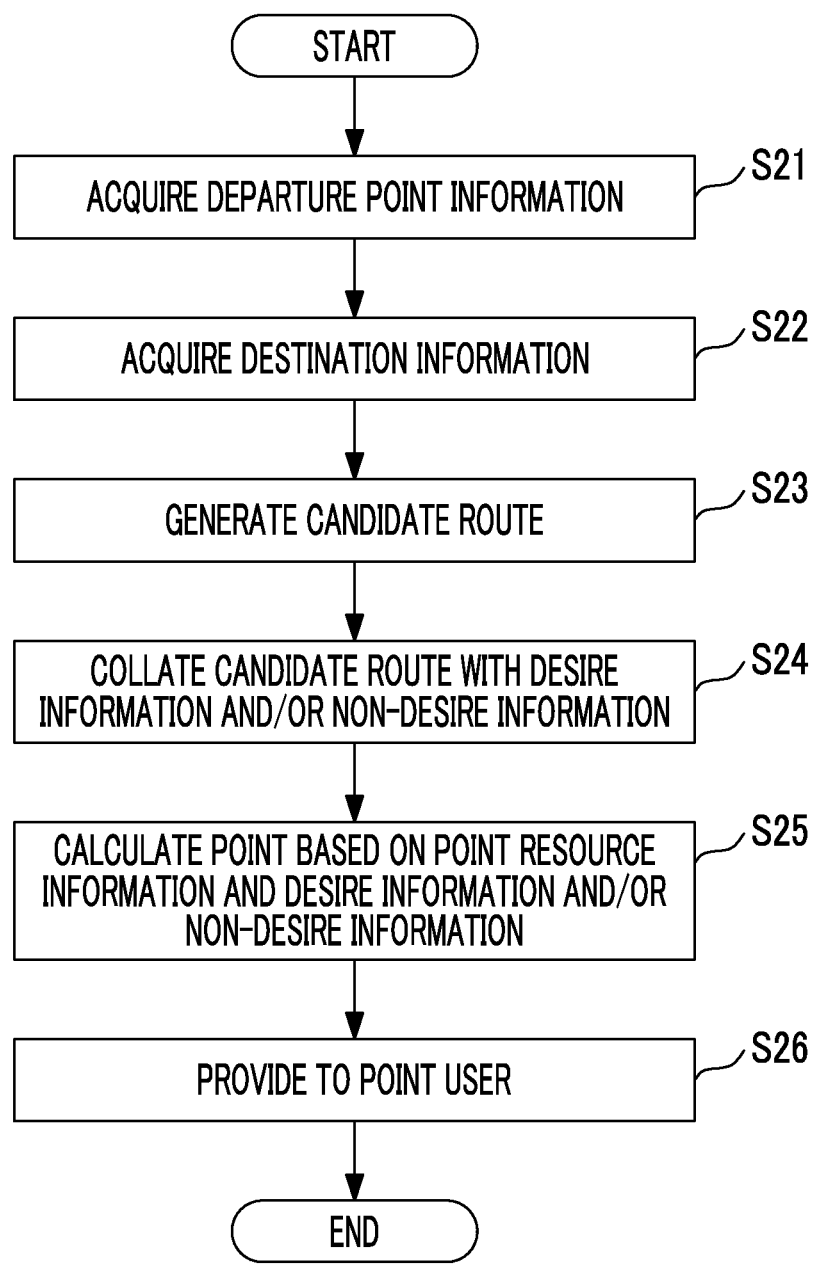
FIG. 5 is a diagram illustrating a flowchart indicating a process in which a user guidance system imparts a point according to a behavior of a user.

FIG. 5 is a diagram illustrating a flowchart indicating a process in which the user guidance system 100 applies a point according to behavior of a user. FIGS. 6A to 6C are diagrams illustrating an example of data that is created in the process in which the user guidance system 100 applies a point according to behavior of a user.

Hereinafter, a process is assumed to be performed in a state in which data in a table format in which IDs of a plurality of attraction desirers and a plurality of point resources are associated, respectively (see FIG. 4A), data in a table format in which the IDs of a plurality of attraction desirers and codes of a plurality of pieces of desire information are associated, respectively (see FIG. 4B), and data in a table format in which the IDs of a plurality of attraction desirers and codes of a plurality of pieces of non-desire information are associated, respectively (see FIG. 4C) are stored in the disk drive 53.

The main controller 110 starts a process when an operation of process start is performed. The operation of the process start is, for example, to press an execution button that is used for the operator of the user guidance system 100 to start the process.

The departure point acquisition unit 112 acquires the departure point information indicating a departure point of the user (step S21). The departure point information is transmitted from the vehicle-mounted device 20 of the user to the user guidance system 100, and is received by the communication unit 121 and transferred to the departure point acquisition unit 112.

The destination acquisition unit 113 acquires the destination information indicating a destination of the user (step S22). The destination information is transmitted from the vehicle-mounted device 20 of the user to the user guidance system 100, and is received by the communication unit 121 and transferred to the destination acquisition unit 113.

The candidate route generation unit 114 generates a plurality of candidate routes connecting the departure point and the destination (step S23). Here, the candidate routes are created.

The collation unit 118 reads the desire information and/or the non-desire information stored in the disk drive 53, and collates the candidate routes generated by the candidate route generation unit 114 with the read desire information and/or the non-desire information (step S24).

The collation unit 118 collates whether the via route or the via point indicated by the desire information is included between the departure point and the destination of the candidate route, and stores the candidate route and the via route or the via point indicated by the desire information in the memory unit 52 in association with each other when the via route or the via point is included (the collation is satisfied).

More specifically, the collation unit 118 creates data in a table format in which the candidate route and the via route or the via point indicated by the desire information are associated with each other, as illustrated in FIG. 6A. In FIG. 6A, for example, desire information with code of XXX001 is associated with the candidate route with code of Route001. The collation unit 118 performs such a process on each candidate route.

Further, the collation unit 118 collates whether the via route or the via point indicated by the non-desire information is included between the departure point and the destination of the candidate route, and stores the candidate route and the via route or the via point indicated by the non-desire information in the memory unit 52 in association with each other when the via route or the via point is included (the collation is satisfied). The collation unit 118 performs such a process for each candidate route.

More specifically, the collation unit 118 creates data in a table format in which the candidate route and the via route or the via point indicated by the non-desire information are associated with each other, as illustrated in FIG. 6B. In FIG. 6B, for example, non-desire information with code of YYY001 is associated with the candidate route with code of Route003. The collation unit 118 performs such a process on each candidate route.

In the case where both the desire information and the non-desire information are not stored in the disk drive 53, the collation unit 118 does not perform the association process as described above.

The point calculation unit 119 calculates a point that is imparted to each of the candidate routes or the via route or the via point included in the candidate routes based on the point resource information, the desire information and/or the non-desire information (step S25).

In step S25, the point calculation unit 119 selects one of a plurality of candidate routes, and reads the point resource information (see FIG. 4A) stored in the disk drive 53 using the ID of the attraction desirer associated with the desire information in the data in a table format illustrated in FIG. 4B when there is the desire information associated with the selected candidate route by referring to the data in a table format in which the candidate route and the desire information (the via route or the via point) are associated with each other as illustrated in FIG. 6A.

The point calculation unit 119 calculates the point that is imparted to the candidate route, or the via route or the via point based on the read point resource information, the candidate route, and the via route or the via point indicated by the desire information.

Here, the candidate route of which the point is calculated is a candidate route with which the desire information is associated. The point of the candidate route is, for example, a sum of respective points of the via routes or the via points included in the candidate route. Further, the point of the candidate route may also be determined using other schemes.

Further, here, the via route or the via point of which the point is calculated may be a via route or a via point indicated by the desire information that is associated with the selected candidate route, and the point may be calculated for each via route or for each route point.

A method of calculating the point includes various methods and, for example, the point can be calculated as follows.

The point to be imparted to the candidate route with the shortest distance among the candidate routes may be set to be small. For candidate routes other than the candidate route with the shortest distance, the point to be imparted may be set to be greater as a distance difference between the candidate route with the shortest distance and the candidate route other than the candidate route with the shortest distance increases.

Further, a point to be imparted to the via route or the via point indicated by the desire information associated with the candidate route with the shortest distance may be set to be small, and a point to be imparted to the via route or the via point indicated by the desire information associated with the candidate route other than the candidate route with the shortest distance may be set to be great as the distance difference between the candidate route with the shortest distance and the candidate route other than the candidate route with the shortest distance increases.

Since the candidate route with the shortest distance is most highly likely to be selected and traffic jam tends to easily occur unlike a usual case, a greater point is imparted to users bypassing the candidate route other than the candidate route with the shortest distance. Thus, it is possible to alleviate the traffic jam and guide the users to various candidate routes.

A point to be imparted to the candidate route including a construction section among the candidate routes may be set to be small, and a point to be imparted to the candidate route including no construction section may be set to be great.

Further, a point to be imparted to the via route or the via point indicated by the desire information associated with the candidate route including the construction section may be set to be small, and a point to be imparted to the via route or the via point indicated by the desire information associated with the candidate route including no construction section may be set to be great.

This is because in the candidate route including a construction section, traffic jam tends to easily occur unlike a usual case, and therefore, more points are imparted to users bypassing the candidate route including no construction section. Thus, the traffic jam can be alleviated and the user can be guided to various candidate routes.

For the candidate route including a commercial facility or the like as the via point among the candidate routes, a point may be set in the via point such as the commercial facility. The point to be set to the via point such as the commercial facility may also be set by the attraction desirer that manages the commercial facility or the like or a greater point may be set in the via point such as the commercial facility of the candidate route in which traffic jam is relatively less according to, for example, the a occurrence situation of traffic jam in the candidate routes.

Thus, the point to be imparted to each of the candidate routes may be calculated so that users are guided to the via route or the via point indicated by the desire information, or the candidate route including the via route or the via point.

Further, when the point is set to be small, the point may be set to zero (no point).

Further, in step S25, the point calculation unit 119 selects one of a plurality of candidate routes, and reads the point resource information (see FIG. 4A) stored in the disk drive 53 using the ID of the attraction desirer associated with the non-desire information in the data in a table format illustrated in FIG. 4C when there is the non-desire information associated with the selected candidate route by referring to the data in a table format in which the candidate route and the non-desire information (the via route or the via point) are associated with each other as illustrated in FIG. 6B.

The point calculation unit 119 calculates the point that is imparted to the candidate route, or the via route or the via point based on the read point resource information, the candidate route, and the via route or the via point indicated by the non-desire information.

Here, when the non-desire information is set, the points are calculated for a candidate route other than a candidate route with which the non-desire information is associated (a candidate route including the via route or the via point indicated by the non-desire information), and a via route or a via point other than the via route or the via point indicated by the non-desire information. Since the attraction desirer does not desire for the user to pass or visit the candidate route with which the non-desire information is associated and the via route or the via point indicated by the non-desire information, the point is set to zero point.

The candidate route other than the candidate route with which the non-desire information is associated is a candidate route with which the non-desire information is not associated and is, for example, a candidate route other than the candidate route with which the non-desire information is associated among a plurality of candidate routes that is generated by the candidate route generation unit 114.

Further, a route or a via point other than the via route or the via point indicated by the non-desire information is, for example, a via route or a via point included in the candidate route other than the candidate route including the via route or the via point indicated by the non-desire information among the candidate routes that are generated by the candidate route generation unit 114.

Points are calculated for the candidate route other than the candidate route with which the non-desire information is associated and the via route or the via point other than the via route or the via point indicated by the non-desire information in order to cause the user to avoid the candidate route with which the non-desire information is associated and the via route or the via point indicated by the non-desire information.

The point of the candidate route other than the candidate route with which the non-desire information is associated is set to a great value, for example, as the number of via routes or via points included in the candidate route with which the non-desire information is associated increases. Further, the point of the candidate route other than the candidate route with which the non-desire information is associated is set to a great value as a degree of the attraction desirer not desiring the passage of the via route or the via point included in the candidate route with which the non-desire information is associated increases. Further, the point may also be determined using other schemes.

Further, the point of the via route or the via point other than the via route or the via point indicated by the non-desire information is set to a great value as the degree of the attraction desirer not desiring the passage of the via route or the via point indicated by the non-desire information increases. Further, the point may also be determined using other schemes. Further, the point may be calculated for each via route or for each via point.

Since the non-desire information indicates the via route or the via point that the attraction desirer does not desire for the user to pass, the user is caused to be away from the via route or the via point through which the attraction desirer does not desire for the user to pass by imparting the point to the via route or the via point that does not correspond to the non-desire information. Thus, it is possible to suppress the user passing through the via route or the via point through which the attraction desirer does not desire for the user to pass, to realize, for example, alleviation of traffic jam or the like, and to guide the user to the candidate route that does not include the via route or the via point through which the attraction desirer does not desire for the user to pass.

For example, when a construction section is registered as the via route or the via point of the non-desire information, it is possible to guide users so that traffic jam is alleviated by avoiding passage of the construction section in which traffic jam tends to easily occur unlike a usual case.

Thus, the point to be imparted to each of the candidate routes point may be calculated so that the user is not guided to the via route or the via point indicated by the non-desire information, or the candidate route including the via route or the via point.

When the current point of the user indicated by the positional information acquired by the position acquisition unit 111 is included in any one of the via routes or at the via point, the point providing unit 120 provides the point assigned to the via route or the via point to the user (step S26).

Specifically, as illustrated in FIG. 6C, the point is transferred to a point account that is specified by the ID of the user. In FIG. 6C, 500 points are transferred to a user with User ID001. When the point providing unit 120 provides a point to the user, the point providing unit 120 displays the point on the display unit 24 of the vehicle-mounted device 20 via the communication unit 121.

The main controller 110 ends the series of processes. The process from the start to the end is repeatedly executed as long as the operator of the user guidance system 100 does not press the execution button for ending the process, or the like.

Figure 7:
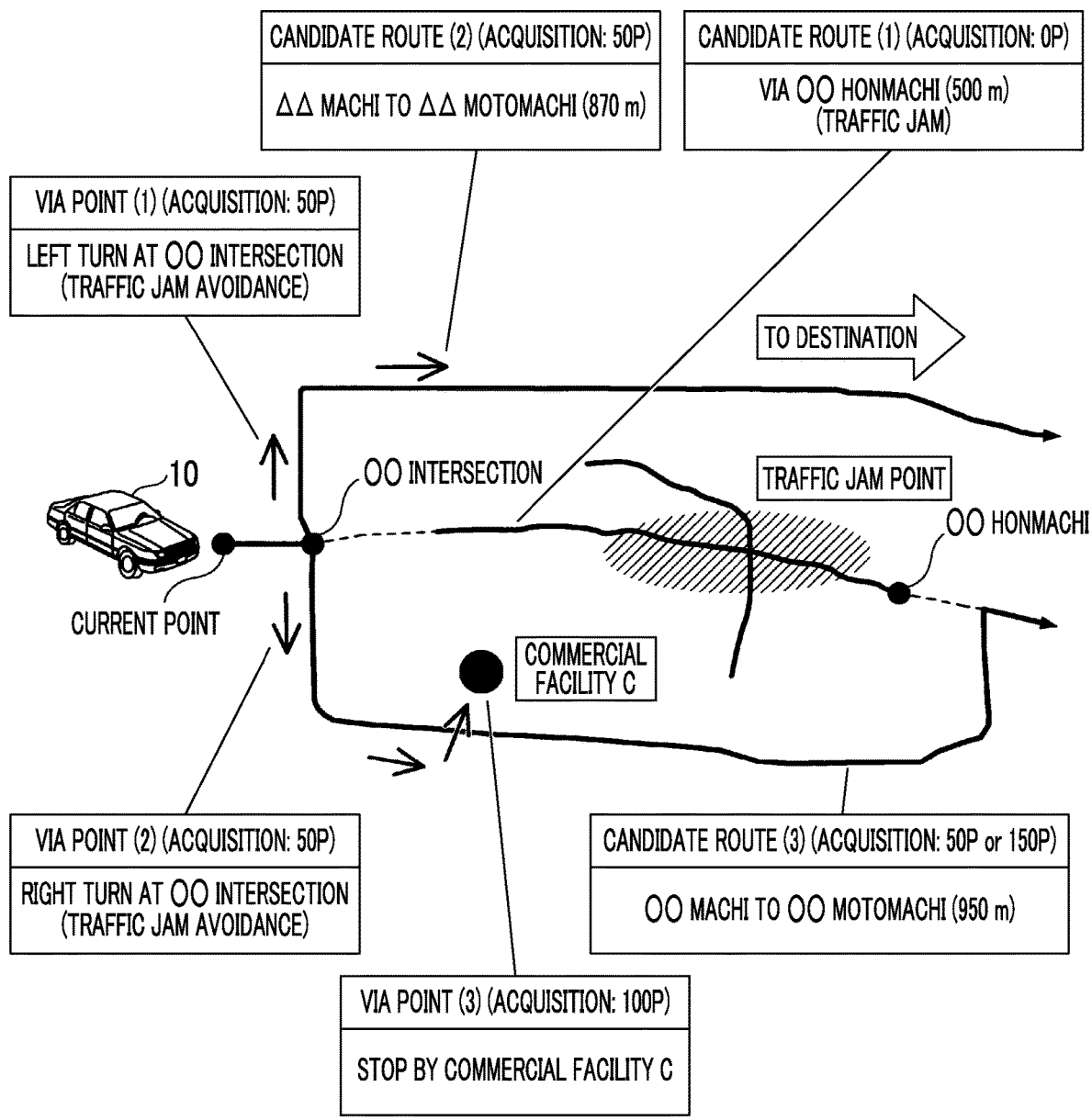
FIG. 7 is a diagram illustrating an example of a plurality of candidate routes that is generated by the user guidance system.

FIG. 7 is a diagram illustrating an example of a plurality of candidate routes that are generated by the user guidance system 100. The candidate routes illustrated in FIG. 7 are displayed on the display unit 24 of the vehicle-mounted device 20. The vehicle 10 is shown for convenience of description and is not displayed on the display unit 24.

In FIG. 7, three candidate routes (1) to (3) and via points (1) to (3) are illustrated. A destination is present to the right of a current point as indicated by an arrow.

The candidate route (1) is a shortest route, and is a candidate route in which a distance up to a destination via a ○ ○ Honmachi after going straight to a ○ ○ intersection is 500 m, and traffic jam occurs. The traffic jam is specified by the non-desire information. An acquired point of the candidate route (1) is a zero point (0 p).

The candidate route (2) is a candidate route of which a distance is second shortest and in which a distance from a △△ Machi to a destination via a △△ Motomachi after turning left at a ○ ○ intersection is 870 m. The candidate route (2) includes turning left at the ○ ○ intersection on condition of the via point (1), and 50 points (50 p) are calculated for turning left at the ○ ○ intersection. Acquired points of the candidate route (2) are 50 points (50 p). The condition of the via point (1) (turning left at the ○ ○ intersection) is set as the desire information by the road manager.

The candidate route (3) is a candidate route of which a distance is third shortest (is longest) and in which a distance from a ○ ○ Machi to a destination via a ○ ○ Motomachi after turning right at the ○ ○ intersection is 950 m. The candidate route (3) includes turning right at the ○ ○ intersection on condition of the via point (2), and 50 points (50 p) are calculated for turning right at the ○ ○ intersection. Further, there is a commercial facility C as the via point (3) along the route of the candidate route (3). When a user stops by the commercial facility C, the 100 points (100 p) is imparted. Acquired points of the candidate route (3) are 50 points (50 p) or 100 points (100 p). The condition of the via point (2) (turning right at the ○ ○ intersection) is set as the desire information by the road manager, and the condition of the via point (3) (a stopover in a commercial facility C) is set as the desire information by an operator (manager) of the commercial facility C.

The user guidance system 100 generates, for example, the three candidate routes (1) to (3) and the via points (1) to (3), calculates the point, and displays the point on the vehicle-mounted device 20.

As described above, by the attraction desirer setting the desire information or the non-desire information, it is possible to guide the user to the via route or the via point indicated by the desire information, or the candidate route including the via route or the via point indicated by the desire information. Further, it is possible to guide the user to the via route or the via point other than the via route or the via point indicated by the non-desire information or the candidate route including the via route or the via point other than the via route or the via point indicated by the non-desire information.

That is, for example, it is possible to suppress concentration of vehicles 10 of users on a candidate route in the shortest distance, a candidate route including a construction section, and the like and to distribute routes through which vehicles 10 of a large number of users pass.

Accordingly, it is possible to provide the user guidance system 100 capable of guiding users according to various purposes.

Further, since the desire information indicating the via route or the via point is used, it is possible to create a map in which needs of the attraction desirer have been reflected when a business person who creates a map such as a dynamic map uses such information.

Further, since the desire information indicating the via route or the via point is used, it is possible to provide candidate routes in which needs of a road manager, a contractor, or the like have been reflected to the user.

When a candidate route including a road that a user of the navigation device does not know, a road of land that the user of the navigation device does not know, or the like is displayed, it is difficult for the user of the navigation device to select such a candidate route. However, since the points according to the desire information or the non-desire information are displayed as described above, it is possible to guide the user of the vehicle 10 having the vehicle-mounted device 20 mounted thereon to various routes.

Further, when a road manager uses the user guidance system 100, it is possible to achieve distribution of users with less cost without performing addition of roads, maintenance of existing roads, or the like.

The aspect in which points are imparted to individual users of the vehicles 10 has been described above. That is, the aspect in which, substantially, the point is imparted to one vehicle-mounted device 20 mounted on one vehicle 10 has been described.

However, a smartphone terminal of a driver of the vehicle 10 or an occupant other than the driver may be paired with the vehicle-mounted device 20 through short-distance wireless communication such as Bluetooth (registered trademark), the point may be imparted to the vehicle-mounted device 20, and the points may be imparted to one or a plurality of smartphone terminals. The point imparted to the smartphone terminal may be, for example, part (for example, 10% to 30%) of a point to be imparted to solely the vehicle-mounted device 20. Alternatively, a point separate from the point to be imparted to solely the vehicle-mounted device 20 may be imparted to the smartphone terminal. In this case, a sum of the points to be imparted to the driver and the occupant in one vehicle 10 is increased by the point of the smartphone terminal.

Further, guidance achievement data indicating achievement of actual guidance of users to the candidate route, or the via route or the via point may be generated, and the candidate route may be displayed on the vehicle-mounted device 20 according to on the guidance achievement data. Further, the point may be calculated according to the guidance achievement data. For example, a higher point may be set to a candidate route with relatively high guidance achievement. Further, a recommendation ranking may be added to the candidate route according to the guidance achievement data and may be displayed. A higher recommendation ranking may be added to the candidate route to which the number of guidances is relatively larger and, on the contrary, a higher recommendation ranking may be added to the candidate route to which the number of guidances is relatively smaller.

Further, the recommendation ranking may be added to the candidate route according to the number of displays as the candidate route on the vehicle-mounted device 20 and displayed. A higher recommendation ranking may be added to the candidate route of which the number of displays is relatively larger and, on the contrary, a higher recommendation ranking may be added to the candidate route of which the number of displays is relatively smaller.

Further, the candidate route may be selected according to an attribute (gender, age, address, or the like), hobby, or the like of a user, and a high recommendation ranking may be added to the candidate route according to the attribute, the hobby, or the like.

The user guidance system of the exemplary embodiments of the present disclosure has been described above, but the present disclosure is not limited to the specifically disclosed embodiments, and various modifications or changes can be made without departing from the claims.

What is claimed is:

1. A user guidance system comprising:
an electronic control unit including a processor for executing programs stored in a memory unit thereof and a display, the electronic control unit configured to:
acquire departure point information indicating a departure point of a user;
acquire destination information indicating a destination of the user;
generate a plurality of candidate routes from the departure point information and the destination information;
acquire point resource information indicating point resources from an attraction desirer;
acquire desire information indicating a via route through which the attraction desirer desires for a user to pass or a via point that the attraction desirer desires for the user to visit;
acquire non-desire information indicating a via route via which the attraction desirer does not desire for the user to pass or a via point that the attraction desirer does not desire for the user to visit;
collate the plurality of candidate routes based on at least one of the desire-information or the non-desire information;
calculate a first point that is imparted to a candidate route of the plurality of candidate routes, or the via route or the via point included in the candidate route based on the point resource information and the desire information;
calculate a second point that is imparted to the candidate route of the plurality of candidate routes, or the via route or the via point included in the candidate route based on the point resource information and the non-desire information; and
provide point information indicating that the first point is higher than the second point to the user,
wherein the first point and the second point being used as a toll fee or a discount coupon for a toll road, or as a usage fee or a discount coupon for a store or commercial facility, and
wherein the attraction desirer is a person who desires to attract the user using the user guidance system to pass through a predetermined route or a predetermined point or so that the user using the guidance system does not pass through a predetermined route or a predetermined point.

2. The user guidance system according to claim 1, wherein the electronic control unit further configured to calculate a point to be imparted to each of the plurality of candidate routes so that the user is guided to the via route or the via point indicated by the desire information, or the candidate route including the via route or the via point.

3. The user guidance system according to claim 1, wherein the electronic control unit further configured to calculate a point to be imparted to each of the plurality of candidate routes so that the user is not guided to the via route or the via point indicated by the non-desire information, or the candidate route including the via route or the via point.

4. The user guidance system according to claim 1, wherein the electronic control unit further configured to acquire current point information indicating a current point of the user,
wherein the electronic control unit further configured to provide point information indicating a point to be imparted to the candidate route, or the via route or the via point included in the candidate route to the user when the current point indicated by the current point information is included in the candidate route, or the via route or the via point included in the candidate route.

5. A user guidance system comprising:
an electronic control unit including a processor for executing programs stored in a memory unit thereof and a display, the electronic control unit configured to:
acquire departure point information indicating a departure point of a user;
acquire destination information indicating a destination of the user;
generate a plurality of candidate routes from the departure point information and the destination information;
acquire point resource information indicating point resources from an attraction desirer;
acquire desire information indicating a via route through which the attraction desirer desires for a user to pass or a via point that the attraction desirer desires for the user to visit;
collate the plurality of candidate routes based on the desire-information;
calculate a point that is imparted to the candidate route of the plurality of candidate routes, or the via route or the via point included in the candidate route based on the point resource information and the desire information; and
provide point information indicating the point that is imparted to the candidate route, or the via route or the via point included in the candidate route to the user,
wherein the attraction desirer is a person who desires to attract the user using the user guidance system to pass through a predetermined route or a predetermined point or so that the user using the guidance system does not pass through a predetermined route or a predetermined point, and
wherein the point is used as a toll fee or a discount coupon for a toll road, or as a usage fee or a discount coupon for a store or commercial facility.

6. The user guidance system according to claim 5, wherein the electronic control unit further configured to calculate a point to be imparted to each of the plurality of candidate routes so that the user is guided to the via route or the via point indicated by the desire information, or the candidate route including the via route or the via point.

7. The user guidance system according to claim 5, wherein the electronic control unit further configured to acquire current point information indicating a current point of the user,
wherein the electronic control unit further configured to provide point information indicating a point to be imparted to the candidate route, or the via route or the via point included in the candidate route to the user when the current point indicated by the current point information is included in the candidate route, or the via route or the via point included in the candidate route.

8. A user guidance system comprising:
an electronic control unit including a processor for executing programs stored in a memory unit thereof and a display, the electronic control unit configured to:
acquire departure point information indicating a departure point of a user;
acquire destination information indicating a destination of the user;
generate a plurality of candidate routes from the departure point information and the destination information;
acquire point resource information indicating point resources from an attraction desirer;
acquire non-desire information indicating a via route through which the attraction desirer desires for a user to pass or a via point that the attraction desirer does not desire for the user to visit;
collate the plurality of candidate routes based on the non-desire-information;
calculate a point that is imparted to the candidate route of the plurality of candidate routes, or the via route or the via point included in the candidate route based on the point resource information and the non-desire information; and
provide point information indicating that the point is a zero point to the user,
wherein the attraction desirer is a person who desires to attract the user using the user guidance system to pass through a predetermined route or a predetermined point or so that the user using the guidance system does not pass through a predetermined route or a predetermined point, and
wherein the point is used as a toll fee or a discount coupon for a toll road, or as a usage fee or a discount coupon for a store or commercial facility.

9. The user guidance system according to claim 8, wherein the electronic control unit further configured to calculate a point to be imparted to each of the plurality of candidate routes so that the user is guided to the via route or the via point indicated by the non-desire information, or the candidate route including the via route or the via point.

10. The user guidance system according to claim 8, wherein the electronic control unit further configured to acquire current point information indicating a current point of the user,
wherein the electronic control unit further configured to provide point information indicating a point to be imparted to the candidate route, or the via route or the via point included in the candidate route to the user when the current point indicated by the current point information is included in the candidate route, or the via route or the via point included in the candidate route.

* * * * *